United States Patent [19]
Jensen

[11] Patent Number: 5,918,505
[45] Date of Patent: Jul. 6, 1999

[54] LINEAR ACTUATOR AND METHOD OF MAKING A LINEAR ACTUATOR

[75] Inventor: Bent Jensen, Nordborg, Denmark

[73] Assignee: Linak A/S, Nordborg, Denmark

[21] Appl. No.: 08/849,891

[22] PCT Filed: Dec. 27, 1995

[86] PCT No.: PCT/DK95/00520

§ 371 Date: Jun. 17, 1997

§ 102(e) Date: Jun. 17, 1997

[87] PCT Pub. No.: WO96/20361

PCT Pub. Date: Jul. 4, 1996

[30] Foreign Application Priority Data

Dec. 23, 1994 [DK] Denmark .................................. 1485/94

[51] Int. Cl.⁶ .................................................. F16H 25/24
[52] U.S. Cl. ........................... 74/89.15; 29/456; 29/516; 74/424.8 R; 74/459; 403/281; 403/359; 411/361
[58] Field of Search ............................ 74/89.15, 424.8 R, 74/459; 29/456, 516; 411/360, 361, 399; 403/279, 281, 359

[56] References Cited

U.S. PATENT DOCUMENTS

| | | | |
|---|---|---|---|
| 3,464,472 | 9/1969 | Reynolds | 151/2 |
| 4,644,811 | 2/1987 | Tervo | 74/412 TA |
| 4,872,903 | 10/1989 | Periou | 74/89.15 |
| 4,934,203 | 6/1990 | Bailey et al. | 74/89.15 |
| 4,939,945 | 7/1990 | Ryder et al. | 74/89.15 |
| 4,983,084 | 1/1991 | Gray | 411/311 |
| 4,983,085 | 1/1991 | Gray | 411/361 |
| 5,366,331 | 11/1994 | Erbes | 411/433 |

FOREIGN PATENT DOCUMENTS

| | | |
|---|---|---|
| 0531247 | 3/1995 | European Pat. Off. . |
| 0577541 | 10/1996 | European Pat. Off. . |

*Primary Examiner*—Allan D. Herrmann
*Attorney, Agent, or Firm*—Watson Cole Grindle Watson, P.L.L.C.

[57] ABSTRACT

A linear actuator includes a driven spindle (10) of metal having a nut (12) of polymeric material which further is connected to the expelling rod (14) of the actuator. The nut and expelling rod are joined to each other by intermeshing embossing mate for contemporary transfer of axial forces and torques. With a polymeric nut a number of advantages are obtained such as low friction, lifetime lubrication, low noise level, low production and maintenance costs. Furthermore, a possibility is provided for in a simple manner to provide the actuator with a safety nut connected to the main nut (12) with breakable entrainment means.

11 Claims, 1 Drawing Sheet

LINEAR ACTUATOR AND METHOD OF MAKING A LINEAR ACTUATOR

BACKGROUND OF THE INVENTION

1. Field of the Invention

The present invention relates to a linear actuator comprising a driven spindle having a nut which is connected to the expelling rod of the actuator. An actuator of this type is for instance known from EP-B1-0 531 247 and EP-A1-0 577 541. The invention also relates to a method of manufacturing the actuator.

2. The Prior Art

Linear actuators that, e.g., are used for raising and lowering movements on hospital beds can be relatively heavily loaded. For instance, an actuator can be loaded with up to 15000 N axially and torques to the size of 25 Nm.

The spindle, the expelling rod as well as the nut of the actuator are made of metal, and the nut is secured to the hollow expelling rod by threaded insertion into the inner thread of the rod and prevented against turning, e.g., by welding.

It is of upmost importance that the nut and the expelling rod are rigidly connected to each other, as the aforementioned axial and torque forces must be transferred from the nut to the expelling rod.

It is not enough that the forces must be transferred in a sufficiently secure manner; there are also in certain cases demands for low friction, life time lubrication, low noise level, low production and service costs. Linear actuators are attractive because they easily can be incorporated in an electrically control and also are relatively inexpensive.

SUMMARY OF THE INVENTION

By the present invention it is realized that the nut, that is to cooperate with the metal spindle, can be made of an elastomeric material for obtaining a lubrication free connection with a minimal friction as the nut and the expelling rod are joined to each other by intermeshing embossings for the transfer of axial forces as well as torques.

In an embodiment the actuator is provided with a safety nut of metal connected to the main nut by breakable entrainment means so that the safety nut follows the main nut as a slave nut, whereby the safety nut takes over the function of absorbing the load.

By a method according to the invention a safe fastening of the nut in the tube is achieved by providing a nut that in one end has a thread and in the other end is provided with axially orientated grooves and where the tube in that part that is intended for receiving said aforementioned grooves is extended in a funnel shape which allows the nut to be screwed into an internal thread in the tube and where the funnel internally is provided with axially orientated grooves intended for engagement with the aforementioned grooves in the nut, and where the funnel section of the tube after the insertion of the nut is clamped together until the grooves in the tube and the grooves in the nut are brought in close engagement with each other.

Hereby is an assembly obtained that can resist both axial and rotational forces and the axially orientated grooves prevent rotation of the nut.

The invention is described in detail in the following with reference to the drawings.

DETAILED DESCRIPTION OF THE PREFERRED EMBODIMENT

Figure 1:
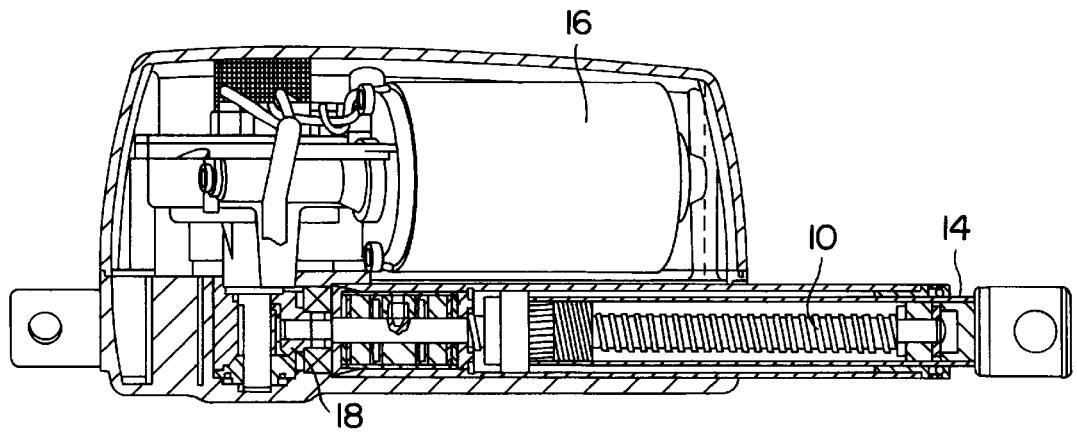
FIG. 1 shows a longitudinal sectional view of an actuator according to the invention.
Figure 2:
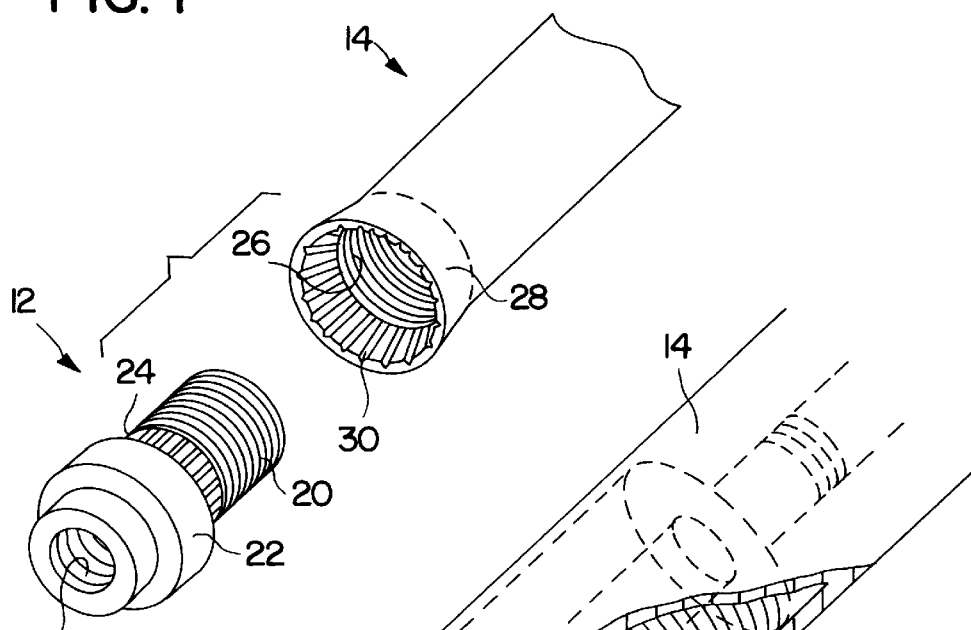
FIG. 2 is a perspective view of the nut and the expelling rod of the actuator according to the invention.

As mentioned in FIG. 1 of the drawings, a longitudinal sectional cutaway view is shown through an actuator that comprises a spindle 10 with a nut 12 of plastic. To the nut is fastened a tubular expelling rod 14. The spindle is driven by an electric motor 16 via a gearing 18. FIG. 2 shows the end of the expelling rod 14 and the nut 12 in an enlarged scale. As it appears, the nut has an inner thread 18 for the spindle 10 and an outer thread 20. The nut 12 comprises also in the shown embodiment a collar 22 and between the collar 22 and the thread 20 a number of axially oriented grooves 24.

A metal tube 14 comprises an inner thread 26 and is at the extreme end extended to a cone shape 28 that internally comprises a number of grooves 30.

The cone shape 28 at the extreme end of the tube 14 can be made by means of a conic pressing tool with a corresponding female part, between which the tube 14 is pressed into the desired conic shape. The male part of the conic pressing tool comprises a number of external axially orientated protrusions that correspond to the grooves 24 of the nut 12, after that the cone 28 is pressed together.

By assembly of the two parts the nut 12 is inserted until the collar 22 abuts the forward facing edge of the cone shape 28. The cone shape of the metal tube 14 is then pressed together whereby the grooves 24 of the nut and the grooves 30 on the metal tube 14 are brought in a locking engagement to each other.

The shown collar 22 has a slightly larger diameter than the tube 14, whereby it e.g. may act as a guiding arrangement for the expelling arm which is slidable in a circular cylindrical passage in the actuator. The extreme end of the expelling arm is guided in a hole with an equal diameter as said arm.

The nut 12 may also be designed without a collar 22 and e.g. end at the edge of the tube 14. The nut may also be countersunk with respect to the edge of the pipe, as long as it is secured that the grooves 24, 30 are engaged to each other along a suitable axial length in order to absorb the torque forces.

An alternative way to mount a nut could be fixing it by injection moulding inside a tube which is prepared with internal grooves extending peripherally, e.g. as a tread or axially. In this connection, it is not nescessary to preform the tube by means of a conic pressing tool, but simply provide it with axial grooves into a certain depth. Said grooves will then be broken by the internal thread, whereby a "waffle structure" will appear, comprising the preferred surfaces to which the nut will engage, and prevent it to let og as a result of axial- or torque forces.

Figure 3:
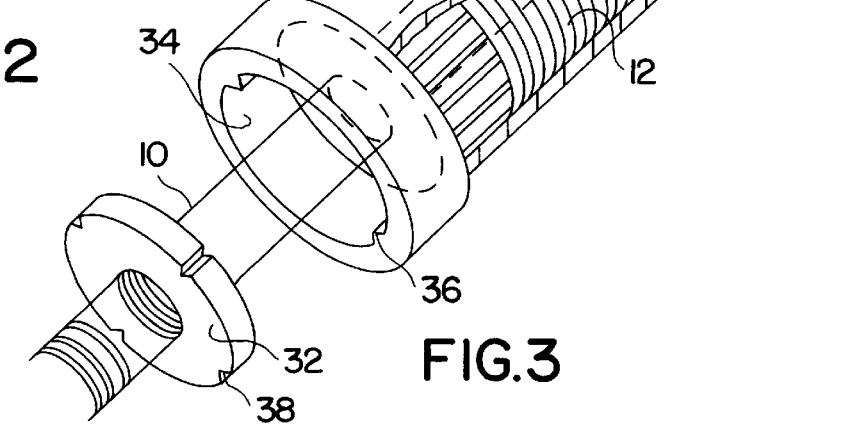
FIG. 3 is a perspective view of the nut and the expelling rod of the actuator in an embodiment with a safety nut.

In FIG. 3 of the drawing is shown an embodiment having a metal safety nut 32 which as a slave follows the main nut 12 and takes over the load if the main nut fails, e.g. as a result of abrasion. Said safety nut 32 is introduced into a recess 34 in the end of the main nut 12 and connected thereto by entrainment flaps 36 in engagement with slots 38 on the outer side of the safety nut 32. The entrainment flaps 36 and the slots 38 are adapted so that the flaps 36 are broken from the main nut 12 by a predetermined load equal to failure of the main nut. By failure the safety nut 32 takes over the load on the expelling rod 14, and as a result of the thereby originated friction between the nut 32 and the spindle 10, the nut will stick on the spindle and participate in its rotation. The entrainment flaps 36 are thereby broken from the main nut, and the safety nut thereby rotates freely against the main nut, while the bottom of the recess in which the safety nut is embedded acts as a sliding bearing. Subsequently, the actuator will then only be able to return to its home position as the friction between the safety nut and the spindle dissapears when the nut are relieved. The operator will expire a malfunction, which almost always will appear by a sudden stop during loaded operation. A natural reaction will be an attempt to make a return movement, which will be succelfull as the safety nut in that way will be relieved and the friction dissappears completely or partially. A further attempt making an extending movement will simply fail in the same way as before. If the extending rod is driven back to the home position further movements will not be possible. Exploiding that the main nut is made of elastomeric material, a visible sign for the need of servicing the actuator is achieved by simple means, without excessively overloading other parts of the construction, and further that the rest of the construction does not suddenly collapse during operation, which could be fatal e.g. by hospital beds, where the head end of the supporting bottom can be raised and lowered by an actuator.

I claim:

1. A linear actuator comprising:
   an electric motor and a transmission,
   a spindle connected with the electric motor and the transmission for rotating the spindle,
   a nut which by the rotation of the spindle can be displaced along the spindle,
   an expelling rod in the nature of a tube, one end of which is mounted to the nut and surrounding at least a length of the spindle,
   wherein said nut is made of an elastomeric material and joined to the expelling rod by intermeshing embossing on at least a part of the outer surface of the nut and at least a part of the interior surface of the expelling rod for the transfer of axial forces as well as torques.

2. A linear actuator in accordance with claim 1, wherein a set of embossings are formed for the transfer of axial forces and another set of embossings are formed for the transfer of torques.

3. A linear actuator in accordance with claim 2, wherein the embossings for the transfer of axial forces are formed as a thread (20,26).

4. A linear actuator in accordance with claim 2, wherein the embossings for the transfer of torques are formed as axially orientated grooves (24, 30).

5. A linear actuator in accordance with claim 1, wherein the nut (12) at one end is embedded in the extreme end of the expelling rod (14) and formed with a collar 22 abutting the end of the expelling rod.

6. A linear actuator in accordance with claim 1, comprising a safety nut (32) of metal connected to the main nut (12) by breakable entrainment means which will be broken in case of failure of the main nut.

7. A linear actuator in accordance with claim 6, wherein the safety nut (32) is embedded in a recess (34) in the end of the main nut (12).

8. A linear actuator in accordance with claim 7, wherein the entrainment means are formd as axial entrainment flaps (36) in slots (34) and that the safety nut (32) has corresponding axial slots (38) on the outer side.

9. A method for manufacturing the actuator according to claim 1, wherein the main nut (32) is fastened to the end of a tube shaped expelling rod (14) by making a conical widening in the end and where the inside is provided with embossings (26,30) having a corresponding embossed pattern (20,24) on the nut, and said nut is fixed by compressing the conical widening around the nut.

10. A method in accordance with claim 9, wherein an innermost set of embossings in the expelling rod (14) is formed as a thread (26), the nut has a corresponding thread (20), the extreme section of the expelling rod is provided with axial grooves (30), the conical widening (28) is limited to this area, the nut is provided with corresponding grooves (24), and the nut is fastened by insertion in the end of the expelling rod, after which the conical widening is compressed around the nut.

11. A method for manufacturing the actuator according to claim 1, wherein
   a conical widening is made in one end of the tube shaped expelling rod,
   providing at least a length of the interior wall of the conical widening with embossings,
   providing at least a length of the outer surface of the nut with embossings corresponding to the embossings on the conical widening of the expelling rod,
   placing at least a part of the nut in the end of the conical widening of the expelling rod such that the embossings on the widening and the nut are situated at least partly facing each other, and
   compressing the conical widening of the expelling rod around the nut such that the embossings of the expelling rod and the nut intermesh and the conical widening area of the expelling rod takes or in essential takes the original tube shape.

* * * * *